(Model.) 2 Sheets—Sheet 1.
G. A. BELKNAP.
BRIDLE BIT.
No. 424,258. Patented Mar. 25. 1890.
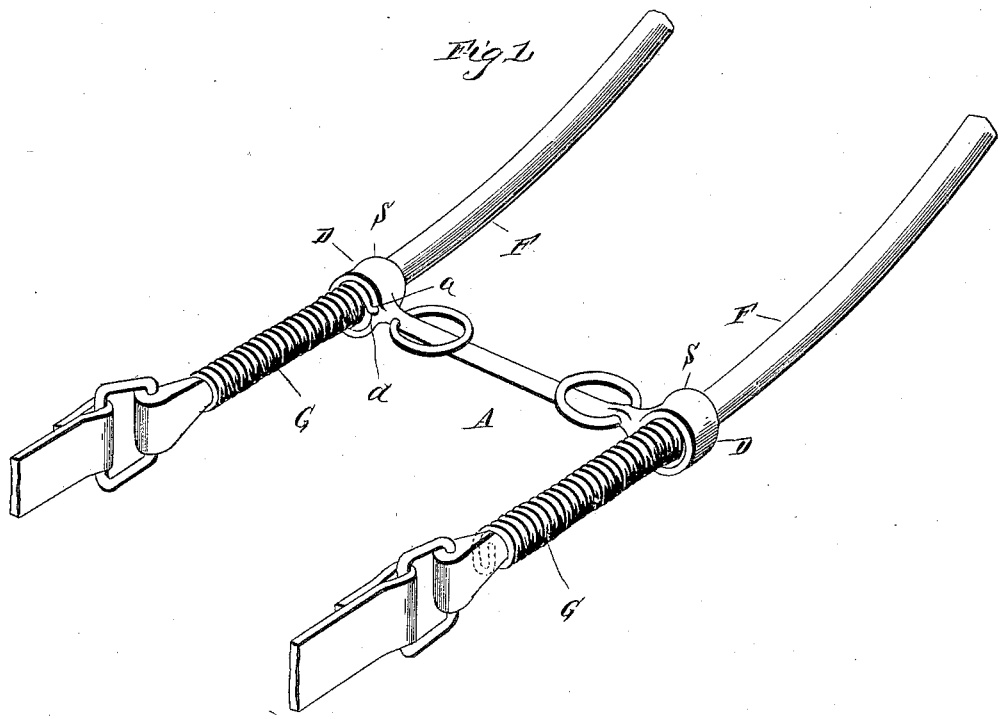
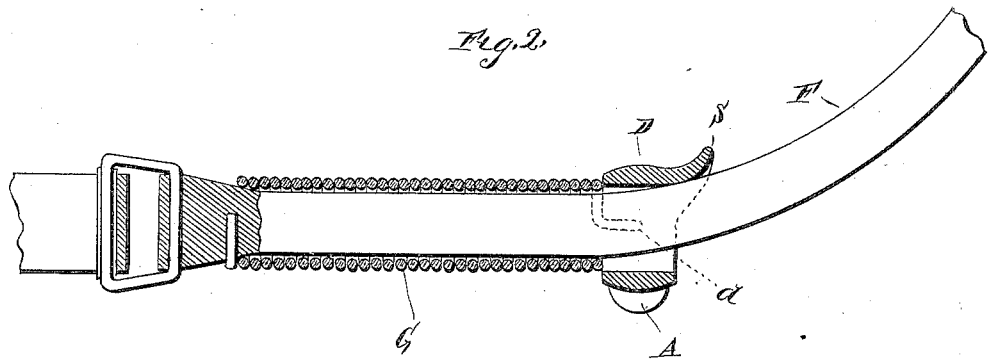
Witnesses
G. S. Taylor
Phil. Masi.
Inventor
G. A. Belknap,
By his Attorney
E. W. Anderson,
N. PETERS, Photo-Lithographer, Washington, D. C.

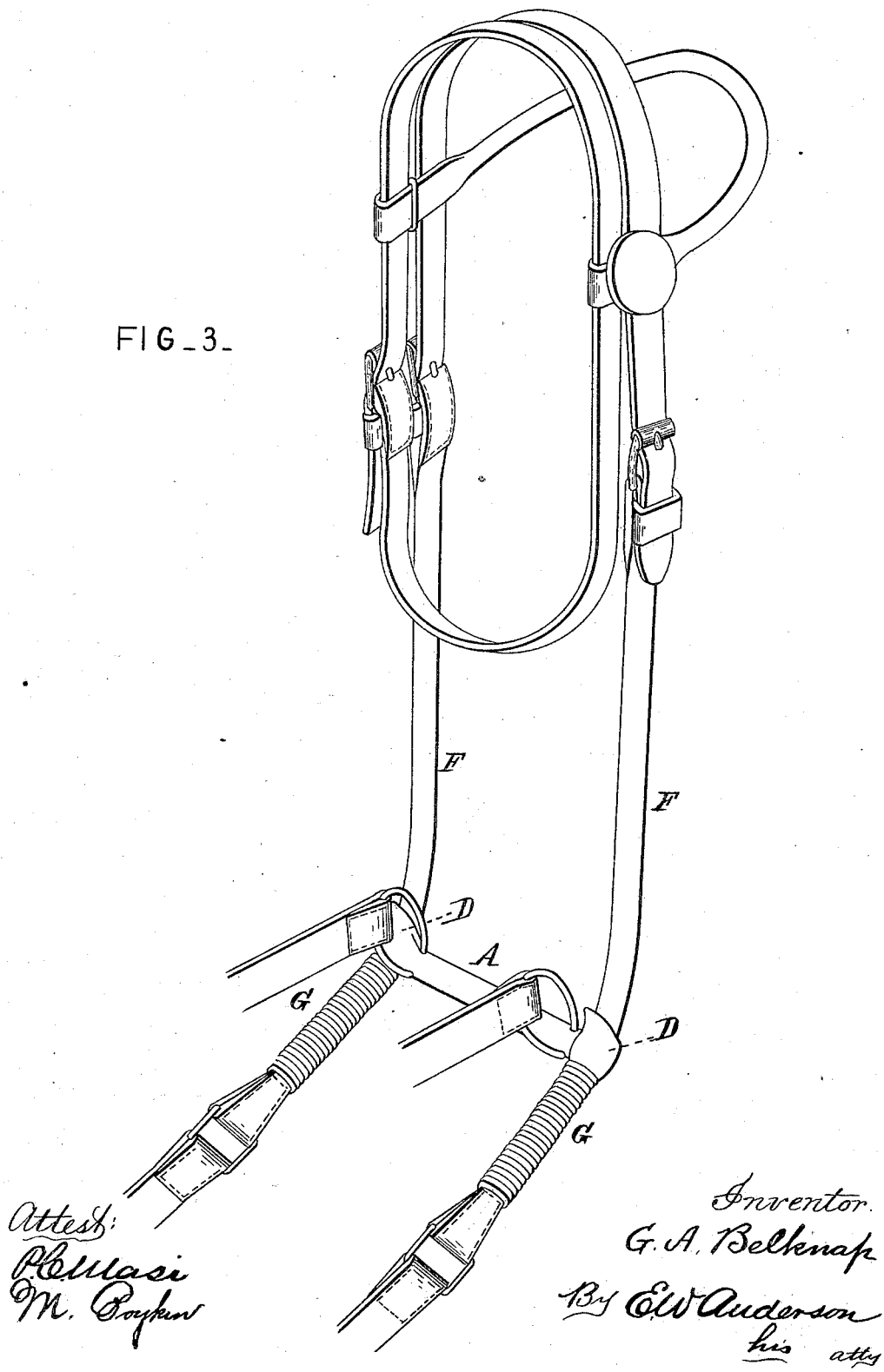

UNITED STATES PATENT OFFICE.

GARDNER ALBERT BELKNAP, OF BEAVER CENTRE, PENNSYLVANIA.

BRIDLE-BIT.

SPECIFICATION forming part of Letters Patent No. 424,258, dated March 25, 1890.

Applcation filed September 30, 1889. Serial No. 325,540. (Model.)

*To all whom it may concern:*

Be it known that I, GARDNER ALBERT BELKNAP, a citizen of the United States, and a resident of Beaver Centre, in the county of Crawford and State of Pennsylvania, have invented certain new and useful Improvements in Bridle-Bits; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of this invention in perspective. Fig. 2 is a sectional view. Fig. 3 is a perspective view of my invention as applied for use to a bridle.

This invention has relation to bridle-bits; and it consists in the novel construction and combination of parts, as hereinafter described, and pointed out in the claims.

The object of the invention is to provide a bit with elastic attachments for the reins, whereby the animal may be driven with a tight rein without a purchase, or, when desired, with a purchase by a greater exertion of force upon the reins, also whereby the purchase may be relieved without slacking the reins.

In the accompanying drawings, the letter A designates the bit, which is broadened at the ends which project from the sides of the animal's mouth to provide for the transverse perforations D. The forward outlets of these perforations flare outwardly from the interior, the upper flaring portion being extended to form a vertical lip projection S, to give a graceful curve to short reins F and prevent chafing the latter against the edges of the openings during the reciprocating movement of the reins, caused by the expansion and contraction of the springs in driving. Through each of the perforations of the bit is passed the short cylindrical rein F, which is connected forward by suitable buckles to the lower ends of the cheek-straps, and in the rear is connected to the driving-reins. A spiral spring G incloses each short rein in rear of the bit, and is connected to the latter by bending the end coil $d$, which is introduced into the transverse eye or perforations $a$ near the inner side of the perforations D and therein secured. The opposite end coil of each spring is bent diametrically across the spring into an eye, and is stitched within a loop of the rear end of the short rein. By this disposition of the parts it will be observed that when the reins proper are attached to the short reins and drawn taut the spring will expand without producing any appreciable effect upon the bit, so far as checking the horse is concerned; but if greater force is exerted the bit will be drawn back to effect the desired purchase and check the animal.

What I claim is—

1. In a bridle-bit, the combination, with the bit proper provided with broad ends having outwardly-flaring lipped perforations, of the short reins attached at each end to the head-band in front and to the driving-reins in rear, the spiral springs surrounding said short reins and connected to the latter in rear and to the bit in front, substantially as specified.

2. The combination, with the bit and its end extensions having perforations, of the short reins, the springs surrounding said reins and connected to the bit, and the driving-reins connected to said short reins, substantially as specified.

In testimony whereof I affix my signature in presence of two witnesses.

GARDNER ALBERT BELKNAP.

Witnesses:
HENRY MONTAGUE,
EMERY CASEY.